(12) United States Patent
Chaudhury et al.

(10) Patent No.: US 8,660,960 B2
(45) Date of Patent: Feb. 25, 2014

(54) DOCUMENT DIGEST ALLOWING SELECTIVE CHANGES TO A DOCUMENT

(75) Inventors: Krish Chaudhury, Milpitas, CA (US); James D. Pravetz, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1956 days.

(21) Appl. No.: 10/306,779

(22) Filed: Nov. 27, 2002

(65) Prior Publication Data

US 2013/0219451 A1    Aug. 22, 2013

(51) Int. Cl.
 *G06F 21/00*    (2013.01)
(52) U.S. Cl.
 USPC .............................................. 705/51; 705/54
(58) Field of Classification Search
 USPC .................. 707/9; 715/530; 713/176; 705/51
 See application file for complete search history.

(56) References Cited

U.S. PATENT DOCUMENTS

| | | | |
|---|---|---|---|
| 5,204,897 A | 4/1993 | Wyman | |
| 5,226,159 A * | 7/1993 | Henson et al. | 1/1 |
| 5,260,999 A | 11/1993 | Wyman | |
| 5,341,429 A | 8/1994 | Stringer et al. | |
| 5,438,508 A | 8/1995 | Wyman | |
| 5,465,299 A | 11/1995 | Matsumoto et al. | |
| 5,509,070 A | 4/1996 | Schull | |
| 5,673,316 A | 9/1997 | Auerbach et al. | |
| 5,708,709 A | 1/1998 | Rose | |
| 5,745,879 A | 4/1998 | Wyman | |
| 5,765,152 A * | 6/1998 | Erickson | 1/1 |
| 5,787,175 A | 7/1998 | Carter | |
| 5,818,447 A * | 10/1998 | Wolf et al. | 715/752 |
| 5,892,904 A | 4/1999 | Atkinson et al. | |
| 5,912,974 A | 6/1999 | Holloway et al. | |
| 5,940,843 A * | 8/1999 | Zucknovich et al. | 715/210 |
| 6,076,166 A | 6/2000 | Moshfeghi et al. | |
| 6,154,757 A * | 11/2000 | Krause et al. | 715/205 |
| 6,249,794 B1 | 6/2001 | Raman | |
| 6,266,654 B1 | 7/2001 | Schull | |
| 6,282,552 B1 * | 8/2001 | Thompson et al. | 715/234 |

(Continued)

FOREIGN PATENT DOCUMENTS

| | | |
|---|---|---|
| EP | 0 565 314 | 10/1993 |
| EP | 1 077 414 | 2/2001 |

(Continued)

OTHER PUBLICATIONS

Author: Menezes, A. J. (Alfred J.), 1965—Van Oorschot, Paul C. Vanstone, Scott A, Title: Handbook of applied cryptography, ISB: 0849385237, Imprint: Boca Raton : CRC Press, c1997 pp. 33 and 321-383.*

(Continued)

*Primary Examiner* — Evens J Augustin
(74) *Attorney, Agent, or Firm* — Finch & Maloney PLLC

(57) ABSTRACT

Methods and apparatus, including computer program products, implementing and using techniques for digital rights management. A set of content items is defined in an electronic document based on a set of rules. The rules in the set of rules are associated with one or more operations that can be performed on content items in the electronic document. The set of content items include only content items that are invariant to the operations associated with the rules in the set of rules. A representation of the content items in the set of content items is generated. An electronic document is also described.

20 Claims, 3 Drawing Sheets

(56) References Cited

U.S. PATENT DOCUMENTS

| | | | |
|---|---|---|---|
| 6,327,578 B1 | 12/2001 | Linehan | |
| 6,343,297 B1 | 1/2002 | D'Anjou et al. | |
| 6,357,004 B1 | 3/2002 | Davis | |
| 6,393,438 B1 | 5/2002 | Kathrow et al. | |
| 6,415,278 B1 | 7/2002 | Sweet et al. | |
| 6,529,905 B1* | 3/2003 | Bray et al. | 1/1 |
| 6,532,541 B1 | 3/2003 | Chang et al. | |
| 6,618,735 B1* | 9/2003 | Krishnaswami et al. | 1/1 |
| 6,671,805 B1* | 12/2003 | Brown et al. | 713/176 |
| 6,772,340 B1 | 8/2004 | Peinado et al. | |
| 6,775,655 B1 | 8/2004 | Peinado et al. | |
| 6,785,815 B1* | 8/2004 | Serret-Avila et al. | 713/176 |
| 6,796,489 B2 | 9/2004 | Slater | |
| 6,824,051 B2 | 11/2004 | Reddy et al. | |
| 6,829,708 B1 | 12/2004 | Peinado et al. | |
| 6,848,048 B1 | 1/2005 | Holmes | |
| 6,876,984 B2 | 4/2005 | Tadayon et al. | |
| 6,895,503 B2* | 5/2005 | Tadayon et al. | 713/168 |
| 6,970,866 B1 | 11/2005 | Pravetz et al. | |
| 6,973,445 B2* | 12/2005 | Tadayon et al. | 705/64 |
| 6,973,618 B2* | 12/2005 | Shaughnessy et al. | 715/239 |
| 7,010,750 B2* | 3/2006 | Burky | 715/764 |
| 7,010,808 B1 | 3/2006 | Leung et al. | |
| 7,024,393 B1 | 4/2006 | Peinado et al. | |
| 7,031,943 B1 | 4/2006 | James et al. | |
| 7,051,005 B1 | 5/2006 | Peinado et al. | |
| 7,069,443 B2 | 6/2006 | Berringer et al. | |
| 7,082,538 B2* | 7/2006 | Bouchard et al. | 713/181 |
| 7,130,445 B2 | 10/2006 | Ruhl et al. | |
| 7,213,269 B2 | 5/2007 | Orthlieb et al. | |
| 7,240,205 B2 | 7/2007 | Greene et al. | |
| 7,268,906 B2 | 9/2007 | Ruhl et al. | |
| 7,278,168 B1 | 10/2007 | Chaudhury et al. | |
| 7,302,576 B2 | 11/2007 | Greene et al. | |
| 7,315,866 B2 | 1/2008 | Wu et al. | |
| 7,315,947 B2 | 1/2008 | Pravetz et al. | |
| 7,353,398 B2 | 4/2008 | Kra | |
| 7,698,559 B1 | 4/2010 | Chaudhury et al. | |
| 2001/0034835 A1 | 10/2001 | Smith | |
| 2002/0002543 A1* | 1/2002 | Spooren et al. | 705/57 |
| 2002/0013765 A1 | 1/2002 | Schwartz | |
| 2002/0019838 A1 | 2/2002 | Petrogiannis | |
| 2002/0029200 A1 | 3/2002 | Dulin et al. | |
| 2002/0065848 A1* | 5/2002 | Walker et al. | 707/511 |
| 2002/0085710 A1 | 7/2002 | Ananth | |
| 2002/0181017 A1* | 12/2002 | Such et al. | 358/1.15 |
| 2002/0184267 A1* | 12/2002 | Nakao | 707/515 |
| 2003/0014483 A1* | 1/2003 | Stevenson et al. | 709/203 |
| 2003/0028774 A1 | 2/2003 | Meka | |
| 2003/0079175 A1 | 4/2003 | Limantsev | |
| 2003/0105816 A1* | 6/2003 | Goswami | 709/204 |
| 2003/0145206 A1 | 7/2003 | Wolosewicz et al. | |
| 2003/0159035 A1 | 8/2003 | Orthlieb et al. | |
| 2003/0182402 A1 | 9/2003 | Goodman | |
| 2003/0217008 A1 | 11/2003 | Habegger et al. | |
| 2004/0006543 A1 | 1/2004 | Twining et al. | |
| 2004/0054908 A1 | 3/2004 | Circenis et al. | |
| 2004/0054930 A1 | 3/2004 | Walker et al. | |
| 2004/0078394 A1* | 4/2004 | Powell et al. | 707/200 |
| 2004/0117726 A1 | 6/2004 | Inada et al. | |
| 2004/0158731 A1 | 8/2004 | Narin et al. | |
| 2004/0230891 A1 | 11/2004 | Pravetz et al. | |
| 2005/0058319 A1 | 3/2005 | Rhoads et al. | |
| 2008/0092239 A1 | 4/2008 | Sitrick et al. | |
| 2008/0092240 A1 | 4/2008 | Sitrick et al. | |
| 2008/0104406 A1 | 5/2008 | Pravetz et al. | |

FOREIGN PATENT DOCUMENTS

| | | |
|---|---|---|
| EP | 1 227 613 | 7/2002 |
| EP | 1398078 A1 | 3/2004 |
| JP | 8-194748 | 7/1996 |
| JP | 10-513289 | 12/1998 |
| JP | 11-212910 | 8/1999 |
| JP | 2002-41482 | 2/2002 |
| JP | 2002-197069 | 7/2002 |
| WO | WO 00/54128 | 9/2000 |
| WO | WO 01/61508 | 8/2001 |
| WO | WO 03/007180 | 1/2003 |

OTHER PUBLICATIONS

He Applied Handbook of Cryptography (Menezes et al., 1997), Chapter 9, section 9.1.*

Microsoft Press "Editing a Macro with the Macro Recorder", Running Microsoft Word 2000, 1999, 6 pages.

XML.com, "An Introduction to XML Digital Signatures", http://www.xml.com/pub/a/2001/08/08/xmldsig.html, Aug. 8, 2001, 8 pages.

Communication pursuant to Article 94(3) EPC for European Application No. 03 711 189.5-211, dated May 5, 2009, 4 pp.

Ortiz, Jr., S. (2000). E-mail protection advances with new technologies. Computer, IEEE Service Center, Los Alamitos, CA, vol. 33, No. 1, XP-000951701; ISSN: 0018-9162, pp. 21-23.

Microsoft: "Online Help—Word disk" Feb. 6, 2001, pp. 1-6, XP002310447.

Schneier, Bruce, "Merkle's Puzzles (Protocol Building Blocks)", Applied Cryptography. Protocols, Algorithms, and Source Code in C, John Wiley & Sons, New York, 1996, 13 pages.

"Adobe Acrobat 4.0 and Digital Signatures," Adobe Acrobat 4.0, Adobe Systems Incorporated, Nov. 1999, 4 pages.

"Digitally Sign PDF Documents", Adobe Acrobat 5.0, Adobe Systems Incorporated, 2001, 3 pages.

"Editing a Macro with the Macro Recorder", Running Microsoft Word 2000, Microsoft Press, 1999, 6 pages.

U.S. Appl. No. 10/306,635, filed Nov. 27, 2002.

Itaru Hosomi et al., "Digital Information Logistics Achitecture 'Medial Shell' and its Billing Utilizing Management", Information Process Society Research Report, vol. 98, No. 85, IPSJ SIG Notes, Japan, Information Processing Society of Japan, Oct. 12, 1998, vol. 98, pp. 49-56.

Notice of Reason for Rejection, for Japanese Application No. 2003-571898, dated Jan. 5, 2010, 3 pages.

"Advent of Adobe Acrobat 5.0! New Publishing Starting with PDF", Professional DTP 2001, June, first edition, Japan, K.K. Kogakusha, May 15, 2001, June first edition, pp. 37-57.

First Office Action, for Canadian Application No. 2,462,818, dated Jun. 14, 2010, 5 pages.

Decision of Rejection, for Japanese Application No. 2003-571898, dated May 11, 2010, 5 pages.

* cited by examiner

DOCUMENT DIGEST ALLOWING SELECTIVE CHANGES TO A DOCUMENT

BACKGROUND

The present invention relates to digital rights management. Software applications for reading or writing electronic documents often come in multiple versions. A cheap or free version of the software application with limited functionality can be used to view electronic documents, for example, on a computer screen. One example of such a free software application is the Adobe® Acrobat® Reader®, manufactured by Adobe Systems Incorporated, San Jose, Calif., which allows a user to read PDF (Portable Document Format) documents.

In addition to the limited functionality software, the same vendor may also provide a feature-rich premium version that allows users to create and manipulate electronic documents in ways that are not provided in the limited functionality version. For example, the Adobe® Acrobat® application also manufactured by Adobe Systems Incorporated, allows a user to work with PDF documents and perform operations such as filling in and saving a form, digitally signing a form field, adding comments, and performing other operations. Currently, the only way for a document user to access these types of features is to buy the premium version of the software.

SUMMARY

In general, in one aspect, this invention provides methods and apparatus, including computer program products, implementing and using techniques for digital rights management. A set of content items is defined in an electronic document based on a set of rules. The rules in the set of rules are associated with one or more operations that can be performed on content items in the electronic document. The set of content items include only content items that are invariant to the operations associated with the rules in the set of rules. A representation of the content items in the set of content items is generated.

Advantageous implementations can include one or more of the following features. The set of rules can be a subset of a set of available rules, where each rule in the set of available rules is associated with one or more operations that can be performed on content items of electronic documents in an electronic document reader. User input selecting one or more rules in the set of available rules can be received and the set of rules can be defined based on the selected rules. Generating a representation can include generating a selective digest of the content items in the set of content items. The set of rules can identify a set of features to be enabled in an electronic document reader having one or more disabled features, where features in the set of features can perform the associated operations. The set of rules can identify a set of features to be disabled in an electronic document reader having one or more enabled features. The electronic document can be received and the set of rules for the electronic document can be received. The set of rules and the representation can be stored in the electronic document. Validation information can be included in the electronic document to authenticate the set of rules and the representation. The validation information can include a digital signature. The digital signature can be of a digest of the set of rules and the representation.

One or more of the rules in the set of rules can be associated with one or more of the following operations: form fill-in operations, signing a signature field, and annotation operations. The electronic document can be a PDF document, and the set of content items can include, for every page in a pages tree of the PDF document, one or more of: a media box region, a crop box region, a resource dictionary, and a page content stream. The set of rules may not include a rule associated with an annotation operation and the set of content items can include, for every non-field annotation in the page of the PDF document, an annotation region, a text label, one or more annotation flags, a content stream of the page of the PDF document, a normal appearance stream, and an appearance state. The set of content items can include, for every field annotation in the PDF document, an annotation region, a text label, a field type, a content stream of the page of the PDF document, a normal appearance stream, a default field value, and, if the features identified in the set of rules are not operable to enable form fill-in operations, an actual field value.

In general, in one aspect, this invention provides methods and apparatus, including computer program products, implementing and using techniques for representing an electronic document. The electronic document has one or more content items; a set of rules for the electronic document, the set of rules having one or more associated operations that can be performed on the one or more content items; a representation generated from content items that are invariant to the operations that are associated with the set of rules; and validation information that can be used to authenticate the set of rules and the representation.

The invention can be implemented to realize one or more of the following advantages. A mechanism is provided with which an author or content provider can ensure that individual users can only make allowed changes to documents. This enables workflows in which the author of an electronic document can enable a particular set of features for a particular electronic document. One example of such a workflow might feature a government agency, such as the Internal Revenue Service (IRS), that would like to distribute forms (such as tax forms) electronically to a large number of recipients. To achieve a true paperless workflow, form recipients (such as taxpayers) need to access features that are typically only available in the premium version of the software. Rather than require all recipients to acquire the premium version of the software application, the agency can enable features of the premium software application in the free software application in a particular context, such as within a particular electronic document. At the same time, the agency has the ability to limit the ways in which users can make changes in the document—for example, by limiting the type of changes to those that are approved by the agency. The vendor can also implicitly control what operations can be performed by the free software application, for example, by charging the author different amounts for enabling different features or for enabling the same feature in different documents. The invention binds a particular instance of feature enablement to a specific electronic document. It makes it nearly impossible for a hacker to transfer the feature enablement from one document to another. It also nullifies the feature enablement if any alterations are made to the core content of the document. At the same time, the invention allows superficial changes (such as form fill-in and save, digital signature, addition of comments etc) to take place without affecting the feature enablement.

The details of one or more embodiments of the invention are set forth in the accompanying drawings and the description below. Other features and advantages of the invention will become apparent from the description, the drawings, and the claims.

DESCRIPTION OF DRAWINGS

Like reference symbols in the various drawings indicate like elements.

DETAILED DESCRIPTION

The techniques that will be described below enable interaction between three major categories of people or entities: vendors, authors, and users. A vendor is a provider of an electronic document reader, such as Adobe Systems Incorporated. An author is someone who for a particular electronic document defines a set of usage rights, based on which features in an electronic document reader are enabled when the electronic document is read. A vendor authorizes the use of the selected features and can, optionally, charge the author for authorizing that use. A user is generally a person or an entity for whom the electronic document is intended. The user has an electronic document reader that allows him or her to receive and read the electronic document and to perform operations that are allowed by the usage rights associated with the electronic document at no cost.

An electronic document, as used herein, refers to a unit of information that can be read or otherwise processed in a computer or some type of electronic document reader. A document can contain plain or formatted text, graphics, sound, other multimedia data, or hyperlinks to other documents. An electronic document can be stored in a computer as one or more files. Often, but not necessarily, a single document is stored as a single file.

A feature can generally be described as a component of a software program (for example, an electronic document reader) that, when enabled, makes it possible to perform one or more defined operations using the software program. The operations are typically performed on data having a particular format or structure that allows the data (for example, an electronic document) to be read or otherwise operated on by the software application.

Figure 1:
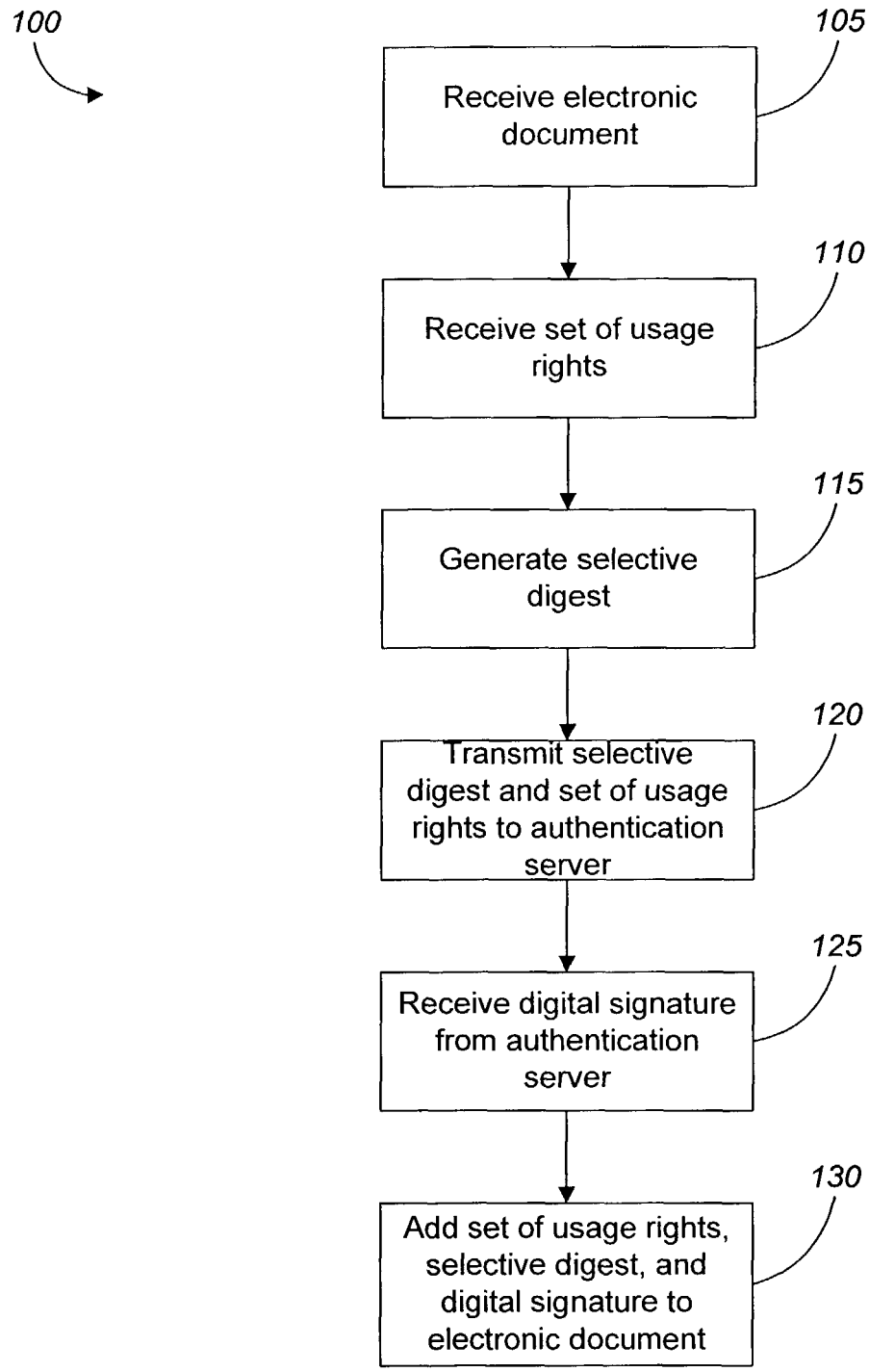
FIG. 1 is a flowchart illustrating the generation of an electronic document including a list of usage rights.

As can be seen in FIG. 1, a procedure 100 for generating an electronic document including a list of usage rights begins by receiving an electronic document (step 105). In the present example, the received electronic document is prepared in an authoring software application, such as a PDF authoring application. The electronic document can be authored by an author, that is, the same person who selects the set of features to be enabled in an electronic document reader, or it can be obtained from a different source. It should be noted that although the invention is explained by way of example, with reference to PDF documents, the techniques described apply to other types of electronic documents or data types in which instructions to an electronic document reader or data processing application can be included.

A set of usage rights is then received (step 110). The set of usage rights represents features that the author of the electronic document desires to be enabled (and that have been approved by the vendor) when a user views the electronic document in an electronic document reader. The set of usage rights can be provided by an author, or be decided automatically by the system based on the electronic document, for example, based on an agreement between the author and the vendor. The enabled features allow a user of the electronic document to perform on the electronic document the operations that are desired by the author of the electronic document. Examples of such operations include digitally signing the electronic document (in a predefined signature field), entering data into predefined fields of the electronic document (such as fill-in form fields, import/export form data in different formats) and annotating the electronic document (such as adding, deleting, editing, importing, and exporting comments or annotations). These features can be made available for the entire document or only for certain sections of the document. The set of usage rights can either be received as part of the electronic document, or be received separately from the electronic document. It should be noted that the enabled features may be a subset of the features that are normally enabled in the premium version of the software application or the electronic document reader.

Next, a selective digest is generated (step 115). The generation of the selective digest will be explained in detail below with reference to FIG. 2. In one implementation, the selective digest is represented as a hash, which acts as a fingerprint of the electronic document and thus uniquely identifies the electronic document. In another implementation the selective digest acts as a fingerprint of only one or more parts of the electronic document, and thus uniquely identifies only those specific parts of the electronic document.

In one implementation, after the set of usage rights and the selective digest have been generated, they are sent to an authentication server hosted by the vendor (step 120), for example, through the Internet. At the authentication server, the vendor determines whether the set of usage rights and selective digest are properly constructed and, optionally, whether proper payment has been received. If there are no problems, the authentication server signs the digest and set of usage rights with a private electronic key for the vendor—that is, a key known only by the vendor—and returns the signed set of usage rights and digest to the author (step 125). The electronic document reader contains a corresponding public electronic key that is supplied by the vendor and that can be used to verify that the use of the features for a particular document has been authorized by the vendor, as will be described in further detail below with respect to FIG. 3.

Finally, the author adds the set of usage rights, the digest, and the signature to the electronic document (step 130), which completes the document generating process and results in an electronic document that is ready to be provided to one or more users.

In another implementation, there is no single public/private key pair and the document is not sent to an authentication server, that is steps 120 and 125 are not carried out. Instead, the set of usage rights and the digest are put in the document by the author, who then signs the document including the usage rights and the digest. In order for the author to be able to sign the document, the author must previously have been granted the permission from the authentication server to sign certain types of documents or documents including certain types of usage rights. One way for the author to obtain such permission is to request a digital certificate from the vendor. If the author is qualified to obtain a digital certificate, the vendor issues an encrypted digital certificate containing a public key and a variety of other identification information for the author. The vendor makes its own public key readily available in the electronic document readers, or gives users the option to download it from the Internet. When the author's signed electronic document is received in an electronic document reader, the vendor's public key is used to decode the digital certificate attached to the electronic document, verifies that the digital certificate was issued by the vendor and then opens the document. This allows the vendor to revoke the permissions for authors that do not fulfill their obligations against the vendor.

Figure 2:
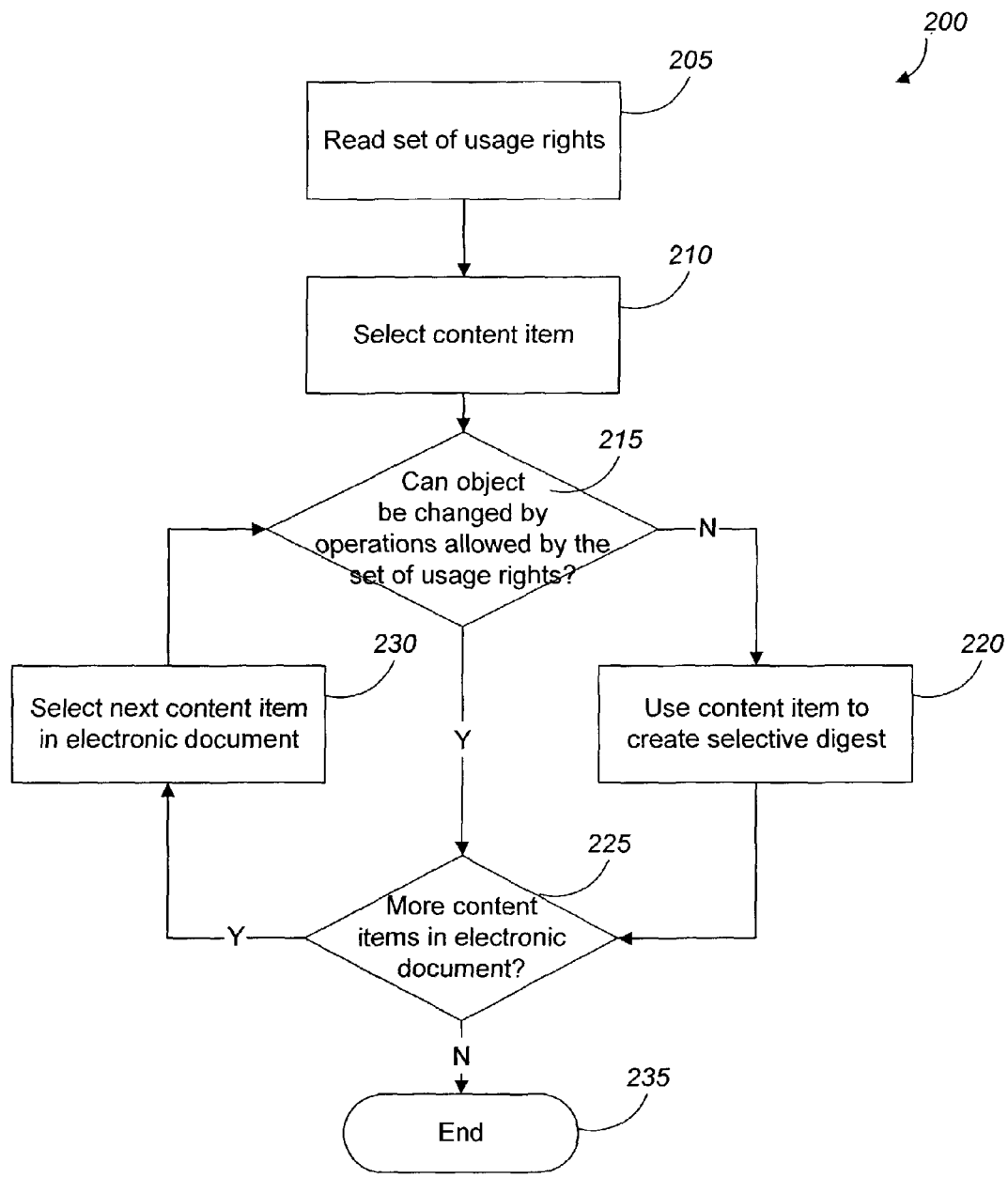
FIG. 2 is a flowchart illustrating the generation of a digest of objects that are not changeable in accordance with the usage rights.

FIG. 2 is a flowchart showing how a selective digest is generated in step 115 in FIG. 1. A digest is generally a piece of data of specific length, calculated from a file or message, in such a way that there is a high probability that any change to the original file or message will result in a change to the digest. The digest typically embodies a one-way mapping function in that so that it is relatively easy to generate the digest from the file or message but extremely hard to generate the message from the digest. A selective digest, as defined in this application, is a digest that is based on selected content items of an electronic document For documents, such as PDF documents that can be described as collections of content items or objects, a selective digest is a digest that is based on some, but not necessarily all, content items of the document. In one implementation, the selective digest is based on the content items of the document that are invariant to operations performed using the features that are associated with the set of usage rights—that is, the content items that always remain the same, no matter which of the allowed operation is are applied to the document. For instance, alterations of page content, addition or deletion of pages, addition or deletion of form fields can be viewed as significant alterations to an electronic document and cause the selective digest to change. On the other hand, form fill in, addition or deletion of comments, and so on, can be viewed as superficial changes and not cause the selective digest to change. The author of an electronic document can thus, based on approval by the vendor, select a degree of flexibility to allow users to make certain authorized changes to the electronic document.

As can be seen in FIG. 2, the process 200 for generating a selective digest starts by reading the set of usage rights (step 205). The set of usage rights is used as a filter criterion when determining which objects are to be considered in the generation of the selective digest.

After the set of usage rights has been read, the process selects a content item in the document (step 210) and determines if the content item is changeable by operations of the features that are associated with the set of usage rights (step 215). If the content item cannot be changed by any of the operations associated with the set of usage rights, then the content item is included in the generation of the selective digest (step 220) and the process continues by determining whether there are any more content items in the electronic document (step 225). If it is determined in step 215 that the content item can be changed by operations allowed in the set of usage rights, then the content item is ignored and the process moves directly to step 225 without using the content item in creating the selective digest. If there are more content items in the electronic document, the process continues by selecting the next content item in the electronic document (step 230) and the process returns and performs steps 215-225 for this content item. When there are no more objects to be examined, the process ends (step 235). All the content items or objects that are considered in the generation of the selective digest described above are objects that reside in the memory of the computer or electronic document reader on which the electronic document is processed. A selective digest of this type is therefore often referred to as an object digest (as opposed to a byte range digest, which is computed by digesting bytes of a file representing an electronic document after the document has been saved to disk). A specific implementation of how a selective digest can be calculated will be described below with reference to a PDF document.

As was discussed above, one type of electronic document is a PDF document. PDF is a file format that is used to represent a document in a format that is independent of the computer software application, hardware, and operating system used to create it. A PDF file contains a PDF document and other supporting data. A PDF document can contain one or more pages. Each page in the document can contain any combination of text, graphics, and images in a device-independent and resolution-independent format. This combination is also referred to as the page description. A PDF document can also contain information possible only in an electronic representation, such as hypertext links, and so on. In addition to a document, a PDF file contains the version of the PDF specification used in the file and information about the location of different important structures in the file.

A PDF document can conceptually be thought of as having four parts. The first part is a set of basic object types used by PDF to represent content items. These object types, with only a few exceptions, correspond to the data types used in the PostScript language. Examples of such data types include booleans, numbers, strings, names, arrays, dictionaries, and streams. The second part is the PDF file structure. The file structure determines how the content items are stored in a PDF file, how they are accessed, and how they are updated. The file structure is independent of the semantics of the content items. The third part is the PDF document structure. The document structure specifies how the basic object types are used to represent various parts of a PDF document, such as pages, annotations, hypertext links, fonts, and so on. The fourth and final part is the PDF page description. The PDF page description is a part of the PDF page object, but only has limited interaction with other parts of the PDF document. A further explanation of PDF files and documents can be found in "Portable Document Format Reference Manual" by Tom Bienz and Richard Cohn, Adobe Systems Incorporated, Addison-Wesley Publishing Company, 1993.

In one implementation, where the electronic document is a PDF document, the content items that are evaluated for inclusion/non-inclusion in the selective digest can, for example, include: MediaBox regions, CropBox regions, resource dictionaries, and the entire page content stream. In this implementation, the selective digest is represented as a hash based on the content items of the document that are invariant to user changes. The hash has a bottom layer, an intermediate layer and a top layer. The bottom layer of the hash is a recursive algorithm and contains the functionality for digesting a basic PDF content item. Simple content items, such as booleans, integers, numbers, strings, and names form the basis of recursion in the bottom layer algorithm. Compound content items, such as dictionaries, arrays, and so on, are digested by recursively digesting the content items making up the compound content items. Special consideration may be necessary for some types of content items, such as PDF language streams (which is a combination of a dictionary and a bitstream), but ultimately all content items are mapped to a sequence of bytes which is digested by a byte hashing algorithm. For each content item, an object type identifier is included in the digest along with the digest of the particular content item instance. For example, if the digesting algorithm encounters an integer of value 42, a type identifier corresponding to the integer type will be included in the digest along with a four byte value signifying the value 42. This makes it possible to distinguish the integer representation 42 from an identical 4 byte string, and so on.

The hashing algorithm can be a conventional hashing algorithm, such as a SHA-1 algorithm, which is a version of the Secure Hash Algorithm (SHA) and described in the ANSI X9.30 (part 2) standard. SHA-1 produces a 160-bit (20 byte) digest. Similarly, an MD5 hash algorithm, which has a 128 bit (16 byte) digest and often is a faster implementation than the SHA-1 algorithm can be used. The hashing algorithm must be capable of providing a condensed and unique representation of the invariant document content, so that the result can be used to determine whether unauthorized changes have been made to the document.

The intermediate layer of the selective hash contains the functionality for digesting semi-complex content items, such as annotations and form fields. The intermediate layer calls the bottom layer whenever necessary. For every field annotation in the PDF document, the content items can include: an annotation region, a text label for the annotation's pop-up window, a field type, a content stream of the page on which the field annotation resides, a normal appearance stream, a default field value, and if form rights are turned off, an actual field value. PDF form field content items have associated annotation content items. The form field content items are therefore digested by including selected elements from the annotation as well as the field dictionary.

The top layer of the selective hash contains the functionality for digesting complex content items, such as pages or an entire PDF document. A PDF page is digested by digesting selected elements from the associated page dictionary. A page template is digested by including a content stream of the page template, and optionally annotations on the page template. An entire PDF document is digested by digesting all the pages, all the form fields, and all page templates, if available.

A few further considerations arise when the hash forming the selective digest of a PDF document is generated, as will now be described. First, in order to avoid infinite recursions, the process 200 for creating the selective digest keeps track of all indirect content items visited during a recursive descent into each content item. The process 200 does not recurse on an indirect content item that has already been visited once. If an already visited content item is encountered, the process 200 merely adds the object type and a fixed integer into the selective digest to indicate that the content item was encountered again.

Second, if form fill-in is allowed, the content of a value field in a field dictionary of the PDF document is never included in the selective digest, since this value would be modified during form fill-in. However, if form fill-in is not allowed, or if some form fields are present before the digest is present and the author may wish to lock these form fields, the content of the value field in the field dictionary of the PDF document is included in the selective digest, so that the form fields cannot be changed. In one implementation, it is also possible to select which form fields to include in the selective digest, such that some form fields can be changed while others must remain unchanged. The same is true for the content stream of the widget annotation corresponding to a field.

Figure 3:
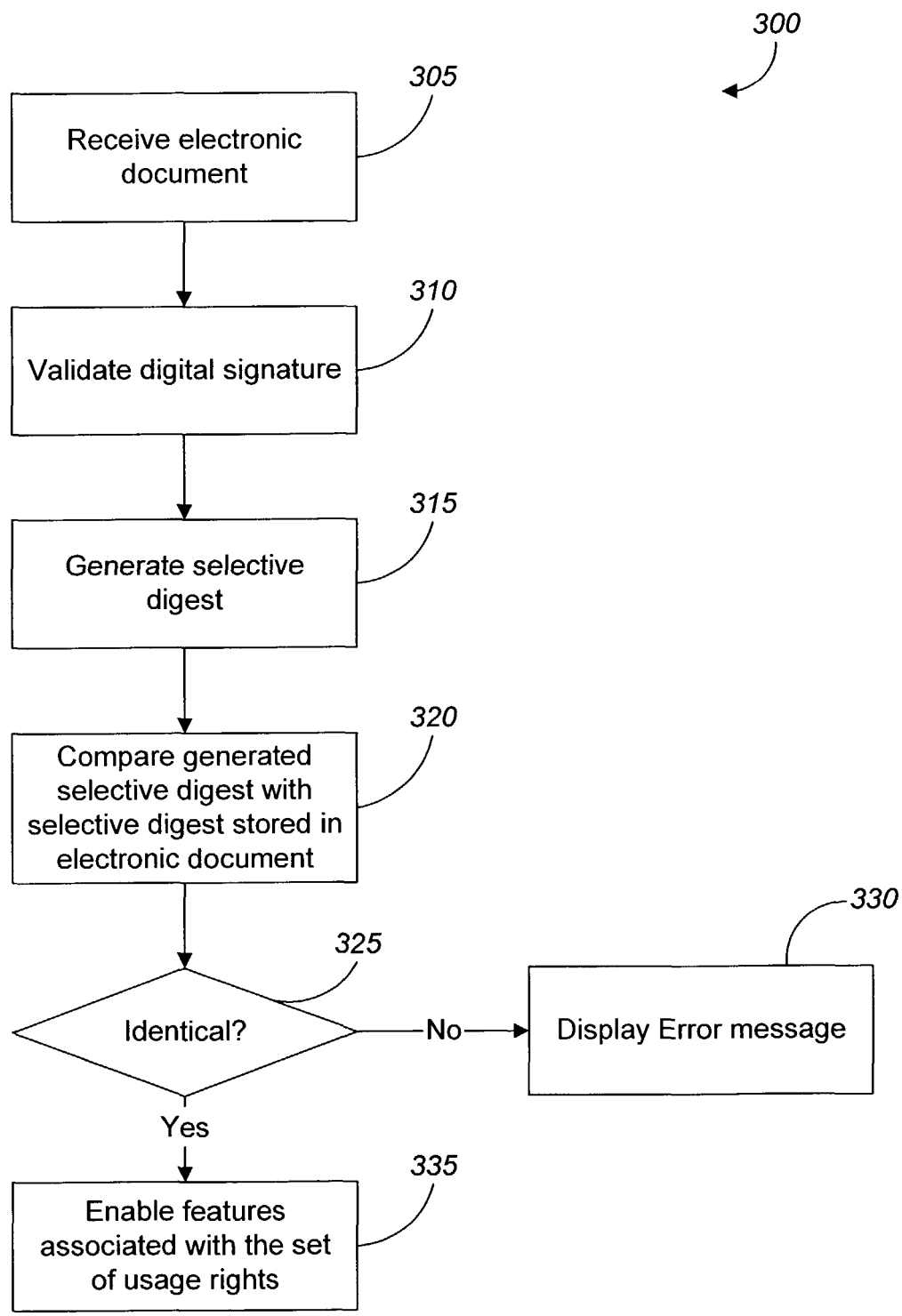
FIG. 3 is a flowchart illustrating enabling features in an electronic document reader.

FIG. 3 shows a process 300 for enabling features in an electronic document reader. The process starts when an electronic document that includes content items, a list of enabled features, a selective digest, and a signature are received (step 305). The electronic document can be received by any type of conventional means, such as through a network as e-mail or be downloaded to a user's computer. Alternatively, the electronic document can be stored on some type of carrier for digital data, such as a floppy disk or a CD.

When the document has been received, the electronic document reader validates the signature (step 310). In one implementation, the validation is performed using a public key that is provided by the vendor in the electronic document reader. The public key corresponds to the private key that the vendor used to sign the set of usage rights and selective digest. The validation establishes that the set of usage rights and the selective digests have not been tampered with and that they are authorized by the vendor.

The electronic document reader then generates a new selective digest of the electronic document (step 315). The generation is performed in the same manner as described above with reference to FIG. 2, with the set of usage rights included in the document as a content filtering guide.

The new selective digest is compared with the signed selective digest that is stored in the electronic document (step 320). The new selective digest and the stored selective digest will be identical only if the signed selective digest was generated from an electronic document that includes invariant content items that are identical to those of the current electronic document—that is, if the content items of the document identified as being invariant to operations of the enabled features have not been modified since the original selective digest was generated, signed, and stored. If the new selective digest and the stored selective digest are identical (the yes branch of step 325), the electronic document reader enables the features described in the set of usage rights (step 335) in the electronic document and operations provided by those features can be used on the electronic document reader. If it is found that the new selective digest and the stored selective digest are not identical (the no branch of step 325), an error message is displayed (step 330), and no features other than the standard limited set of features of the electronic document reader can be used.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. Steps need not be performed in the order described above. While the examples above describe the enablement of features for an entire electronic document, in alternative implementations, features can be enabled for only specific content items in the document. Also, the features discussed above are merely examples of features that are useful in workflows for PDF documents. Other features can be enabled or disabled for other types of documents, using techniques similar to these presented above. Accordingly, other embodiments are within the scope of the following claims.

What is claimed is:

1. A computer-implemented method comprising:
receiving, by an electronic document reader, an electronic document that includes (a) a plurality of content items, (b) a set of rules that defines a set of allowed operations which are authorized to be performed on the plurality of content items included in the electronic document, and (c) a first selective digest generated by a document author;
identifying, by a processor, one or more invariant content items from amongst the plurality of content items, wherein the invariant content items remain unchanged when the set of allowed operations are performed on the plurality of content items included in the electronic document;
generating, by the processor, a second selective digest of the one or more invariant content items;
performing, by the processor, a comparison of the first selective digest generated by the document author and the second selective digest generated by the processor, wherein the comparison results in validation information;
disabling, by the electronic document reader, the allowed operations when the comparison of the first and second selective digests indicates that operations have been performed on the electronic document which are not allowed under the set of rules; and
saving, on a computer readable storage device, a version of the electronic document that includes the set of rules and the validation information.

2. The method of claim 1, wherein the second selective digest is represented as a hash having a lower layer containing functionality for digesting a basic content item, an intermediate layer containing functionality for digesting a semi-complex content item, and an upper layer containing functionality for digesting a complex content item.

3. The method of claim 1, wherein the second selective digest is represented as a hash having a lower layer containing functionality for digesting a basic content item that consists of a string, an intermediate layer containing functionality for digesting a semi-complex content item that consists of an annotation, and an upper layer containing functionality for digesting a complex content item that consists of a page.

4. The method of claim 1, wherein disabling the allowed operations further comprises providing, by the electronic document reader, an error message indicating that an unauthorized operation has been performed.

5. The method of claim 1, further comprising receiving, by the electronic document reader, user input that defines the set of rules.

6. The method of claim 1, wherein the set of allowed operations includes an operation selected from the group consisting of a form fill-in operation, a signature field signing operation, and an annotation operation.

7. The method of claim 1, wherein the set of allowed operations does not include an annotation operation.

8. The method of claim 1, wherein the one or more invariant content items includes a content item selected from the group consisting of an annotation region, a text label, an annotation flag, and an appearance state.

9. A system for validating an electronic document, the system comprising:
one or more processors;
an electronic document reader; and
a non-transient computer-readable medium having an electronic document stored thereon, the electronic document comprising:
a plurality of content items including one or more invariant content items;
a set of rules that defines a set of allowed operations which are authorized to be performed on the plurality of content items by the electronic document reader, wherein performing the allowed operations does not result in any changes being made to the one or more invariant content items;
a first selective digest that is generated by a document author based on a first digesting of the one or more invariant content items;
validation information that results from a comparison of the first selective digest and a second selective digest that is generated by the one or more processors based on a subsequent digesting of the one or more invariant content items, wherein the validation information indicates whether operations have been performed on the electronic document which are not allowed under the set of rules; and
instructions configured to cause the electronic document reader to disable the allowed operations when the comparison of the first and second selective digests indicates that operations have been performed on the electronic document which are not allowed under the set of rules.

10. The system of claim 9, wherein the second selective digest is represented as a hash having a lower layer containing functionality for digesting a basic content item that consists of a string, an intermediate layer containing functionality for digesting a semi-complex content item that consists of an annotation, and an upper layer containing functionality for digesting a complex content item that consists of a page.

11. The system of claim 9, wherein one or more of the rules in the set of rules are associated with an operation selected from the group consisting of a form fill-in operation, a signature field signing operation, and an annotation operation.

12. The system of claim 9, wherein the set of allowed operations does not include an annotation operation.

13. The system of claim 9, wherein the one or more invariant content items includes a content item selected from the group consisting of an annotation region, a text label, an annotation flag, and an appearance state.

14. A non-transient machine-readable medium having instructions encoded thereon that, when executed by a processor, causes an electronic document validation process to be carried out, the process comprising:
receiving, by an electronic document reader, an electronic document that includes (a) a plurality of content items, (b) a set of rules that defines a set of allowed operations which are authorized to be performed on the plurality of content items included in the electronic document, and (c) a first selective digest generated by a document author;

identifying, by the processor, one or more invariant content items from amongst the plurality of content items, wherein the invariant content items remain unchanged when the set of allowed operations are performed on the plurality of content items included in the electronic document;

generating, by the processor, a second selective digest of the one or more invariant content items;

performing, by the processor, a comparison of the first selective digest generated by the document author and the second selective digest generated by the processor, wherein the comparison results in validation information;

disabling, by the electronic document reader, the allowed operations when the comparison of the first and second selective digests indicates that operations have been performed on the electronic document which are not allowed under the set of rules; and saving, on a computer readable storage device, a version of the electronic document that includes the set of rules and the validation information.

15. The non-transient computer-readable medium of claim 14, wherein disabling the allowed operations further comprises providing an error message indicating that an unauthorized operation has been performed.

16. The electronic document reader of claim 14, wherein the process further comprises receiving user input that defines the set of rules.

17. The non-transient computer-readable medium of claim 14, wherein the second selective digest is generated based on all of the invariant content items identified from amongst the plurality of content items.

18. The non-transient computer-readable medium of claim 14, wherein the second selective digest is generated by recursively digesting the one or more invariant content items.

19. The non-transient computer-readable medium of claim 14, wherein the second selective digest is represented as a hash having a lower layer containing functionality for digesting a basic content item, an intermediate layer containing functionality for digesting a semi-complex content item, and an upper layer containing functionality for digesting a complex content item.

20. The non-transient computer-readable medium of claim 14, wherein the set of allowed operations includes an operation selected from the group consisting of a form fill-in operation, a signature field signing operation, and an annotation operation.

* * * * *